United States Patent [19]

Dowton

[11] Patent Number: 4,761,013
[45] Date of Patent: Aug. 2, 1988

[54] USER PROPELLED VEHICLE

[75] Inventor: Gordon H. Dowton, Toronto, Canada

[73] Assignee: The Board of Governors of Ryerson Polytechnical Institute, Toronto, Canada

[21] Appl. No.: 31,609

[22] Filed: Mar. 30, 1987

[51] Int. Cl.⁴ ............................................. B62M 29/00
[52] U.S. Cl. ............................ 280/87.02 R; 280/218; 272/114; 297/300; 297/5
[58] Field of Search ................... 280/87.01, 87.02 R, 280/87.02 W, 218, 87.03, 118; 272/114, 70.3; 128/25 R; 297/300, 306, 423, 429, 433

[56] References Cited

U.S. PATENT DOCUMENTS

| Re. 30,954 | 6/1982 | Smith et al. | 297/118 |
| 300,228 | 6/1884 | DePew | 297/300 |
| 885,977 | 4/1908 | Brown | 280/87.02 R |
| 1,510,585 | 10/1924 | Cushing et al. | 280/87.02 W |
| 2,849,051 | 8/1958 | Streeter | 297/347 |
| 3,039,784 | 1/1961 | Davis | 280/87.02 R |
| 3,044,797 | 7/1962 | Borland | 280/87.02 W |
| 3,129,952 | 12/1962 | Rivers | 280/87.02 W |
| 3,406,772 | 10/1968 | Ahrent et al. | 180/9.23 |
| 3,970,325 | 7/1976 | Wirsig | 280/87.02 W |
| 4,591,182 | 5/1986 | Wood | 280/647 |

FOREIGN PATENT DOCUMENTS 174328  3/1953  Austria .......................... 280/218

Primary Examiner—David M. Mitchell
Assistant Examiner—Brian L. Johnson

[57] ABSTRACT

A user propelled vehicle comprises a seat frame, a back pivotally connected to the rear of the seat frame about a first pivot axis and a leg support pivotally connected to the front of the seat frame about a second pivot axis parallel to the first. A support surface engaging roller is provided on each of the seat frame and the leg support. The leg support and the seat frames can rollingly approach and retreat from one another along a floor or other support surface between a contracted position, in which the seat frame extends forwardly upwardly and the leg support extends sharply forwardly downwardly from the seat frame, and an extended position, in which the seat frame extends approximately horizontally and the leg support inclines relatively gently to the frame. A hydraulic linkage is provided for maintaining the vehicle in the contracted and extended positions and for maintaining the back in positions extending sharply upwardly from or relatively gently inclining with respect to the seat frame. In the contracted position, the user's body is firmly retained on the vehicle. The rollers support the vehicle on the floor with the seat frame supported a short distance above the support surface so that the user can propel the vehicle by thrusting on the support surface with synchronous or asynchronous movements of his or her hands. In the extended position the user can relatively easily lift himself or herself onto and off the vehicle.

27 Claims, 6 Drawing Sheets

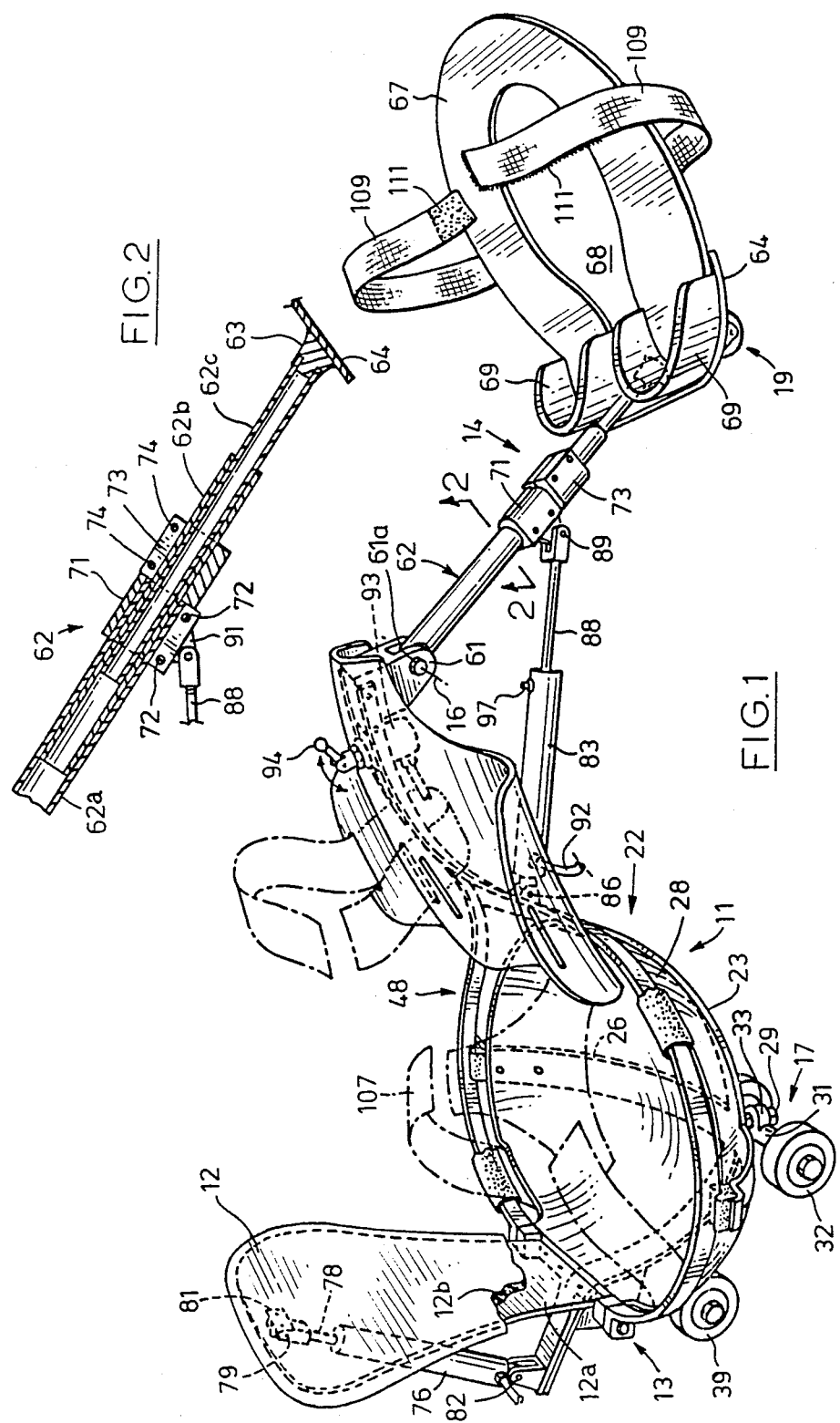

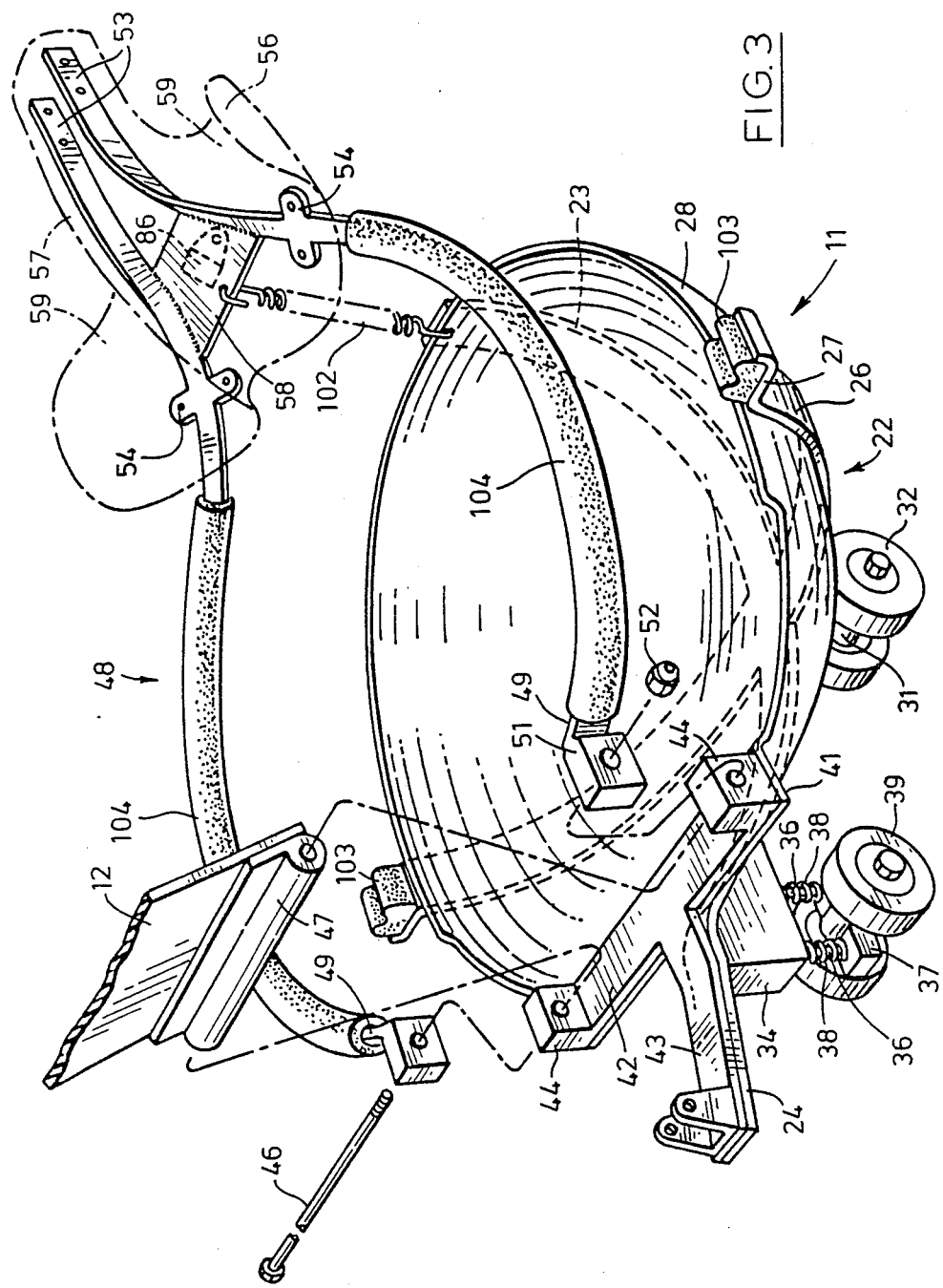

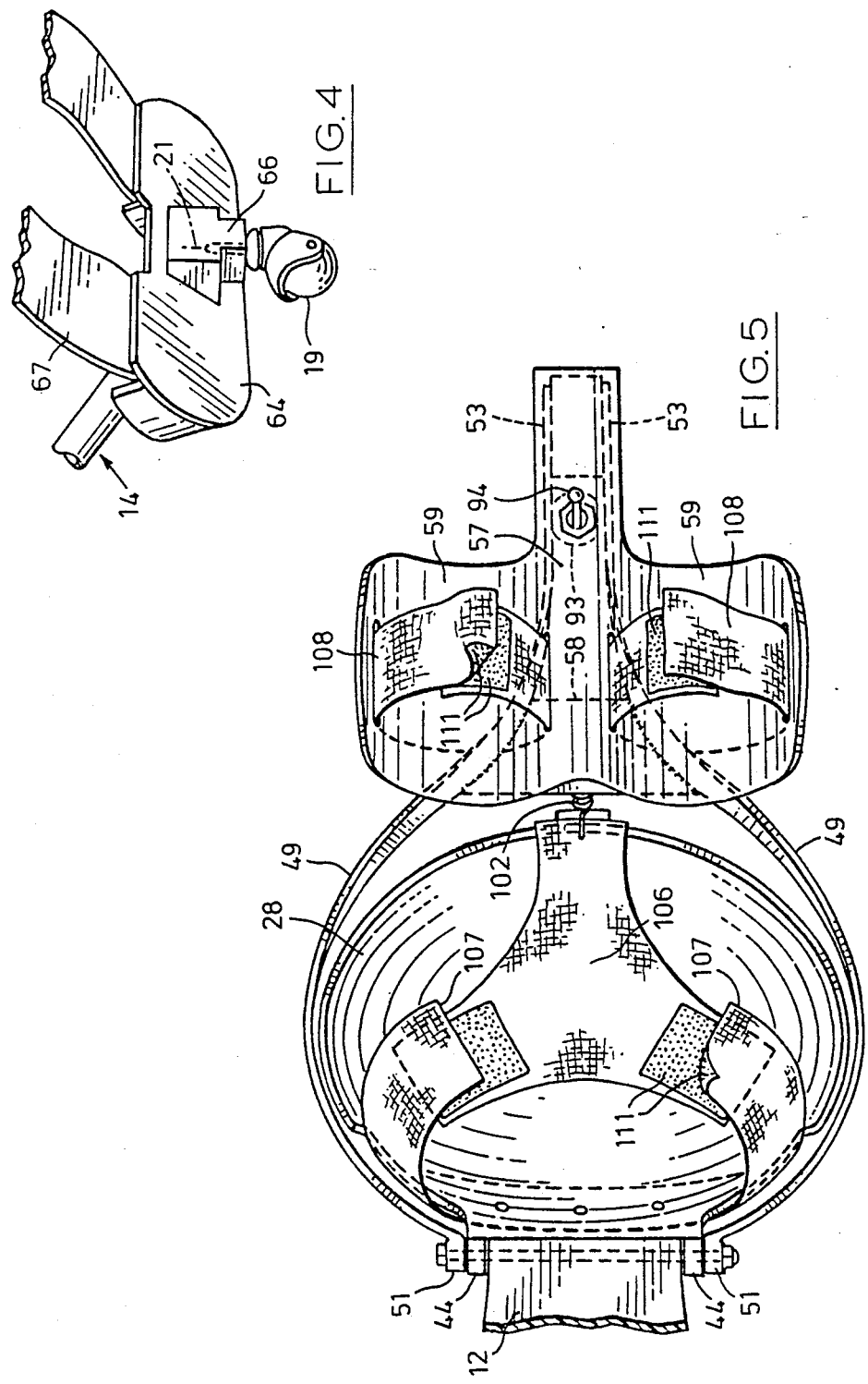

USER PROPELLED VEHICLE

The present invention relates to a user propelled vehicle especially, although not exclusively, for use as an athletic vehicle by paraplegics and like disabled persons.

In the conventional wheelchair, a person sits in an upright position and grips on the tops of hand wheels which are provided adjacent large diameter ground wheels in order to move the vehicle. This chair has numerous disadvantages as a vehicle for use in sports and games. The chair limits the movement of the upper body of the user. Further, efficient means of locomotion such as bicycling and walking use asynchronous reciprocal limb movements whereas even, synchronous movements of the arms are required for straight ahead propulsion with the conventional wheelchair.

The present invention provides a user propelled vehicle comprising a seat frame, a back pivotally connected to the rear of the seat frame about a first pivot axis, a leg support pivotally connected to the front of the seat frame about a second pivot axis parallel to the first, a support surface engaging roller on each of the seat frame and the leg support, and the leg support and seat frames rollingly approaching and retreating from one another along the support surface between a contracted position, in which the seat frame extends forwardly upwardly and the leg support extends sharply forwardly downwardly from the seat frame, and an extended position, in which the seat frame extends approximately horizontally and the leg support inclines relatively gently thereto, and means for maintaining the vehicle in said contracted and extended positions and for maintaining the back in positions extending sharply upwardly from or relatively gently inclining with respect to the seat frame, and wherein said rollers support the vehicle on the support surface with said first and second pivot axes normally generally horizontal and with the seat frame supported a short distance above the support surface so that the user occupying the seat frame can propel the vehicle by thrusting on the support surface with the user's hands.

In use, the wheelchair athlete or other user will normally occupy the vehicle with the seat frame and leg support in the retracted position, so that the user's knees are somewhat bent upwardly and the user's legs are maintained well clear of the floor or other support surface and with the seat back in a relatively sharply upwardly extending position, supporting the user's back. In this position, the user can manoeuver the vehicle by thrusting on the floor with the user's hands. The movements of the hands may be synchronous or asynchronous, in which case the user "walks with the hands" along the surface, or one handed controlled propulsion is possible. The flexed position of the vehicle and of the user's body tends to locate the user on the vehicle and to avoid or reduce risk of reaction between the user's arms and the floor dislodging the user relative to or from the vehicle. With the vehicle positioned in the extended position and with the back maintained in a relatively gently inclining position, the user can lift him or herself onto and off the vehicle, for example from or onto a conventional upright wheelchair. The relatively horizontal configuration and low profile of the vehicle greatly facilitates the user's lifting him or herself onto and off the vehicle without requiring assistance or special auxiliary apparatus.

In one advantageous and highly preferred form of the present vehicle, there are means resiliently biasing the vehicle toward the contracted position and the back toward the sharply upwardly inclining or supporting position, thus facilitating movement of the vehicle to the position of normal use from the above-mentioned relatively horizontal, low profile configuration adopted when mounting the vehicle. Further, there are linkage means between the back and the leg support so that these move in unison relative to the seat frame between the above-mentioned position of normal use and the relatively horizontal, low profile configurations. This allows the user to temporarily adopt a relatively elongated position by leaning backwards to depress the vehicle back downwardly, thus allowing the user to adopt a blocking position, for example, in games involving passing of a ball between players or in games involving scoring by throwing the ball into a goal, net, basket or the like. Moreover, especially where the user is anchored in the vehicle by retaining strapping or the like, the vehicle allows the user the possibility of performing a lateral roll-over.

Preferably the seat frame comprises a thigh support frame and a separate seat support frame pivoted thereto which drops downwardly forwardly relative to the thigh support frame to allow the user's pelvis to drop and rotate forwardly relative to the thighs when the user leans forward to place his or her hands forwardly on the floor before stroking backwards. This allows the user to propel the vehicle forwardly more efficiently and comfortably.

One embodiment of a vehicle in accordance with the invention is illustrated in the accompanying drawings, by way of example only.

FIG. 1 is a perspective view of a presently preferred form of vehicle in accordance with the invention;

FIG. 2 shows a cross-section taken on the line 2—2 in FIG. 1 through a telescoping portion of a lower leg strut of the vehicle;

FIG. 3 is an enlarged view, partially exploded, of the seat, seat support frame, thigh support frame and thigh support of the vehicle;

FIG. 4 is a partial perspective view from beneath the foot support plate and its supporting caster wheel;

FIG. 5 is a plan view of the seat, thigh support and thigh support frame, showing the strapping for retaining the user;

Figure 6:
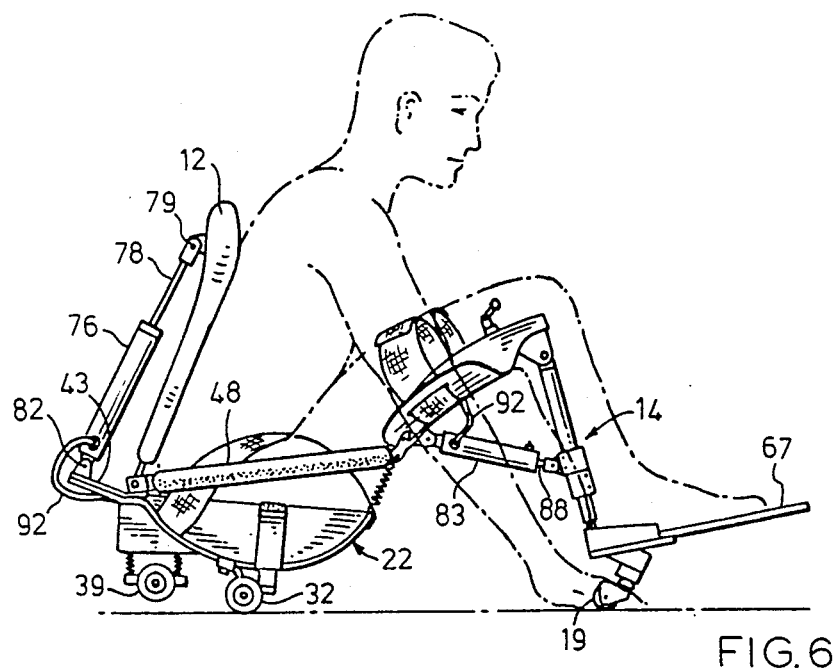
FIGS. 6 and 7 show side views of the vehicle in contracted configuration and in a subsequent stage of forward propulsion, respectively.

Referring to the drawings, the vehicle comprises a seat frame 11 and a back 12 which may comprise a rigid plate 12a, for example a fibre-reinforced plastic moulding, and a soft, for example resilient foam, cover 12b. The plate 12a is pivoted to the frame 11 at a normally horizontal pivot axis 13. A leg support 14 is pivotally connected to the front end of seat frame 11 at a normally horizontal pivot axis 16. A roller arrangement 17 for supporting the seat frame so that it can roll freely on a floor or other support surface is fixed to the seat frame 11. A roller in the form of a single caster wheel 19 is connected to the forward and lower end of the leg support 14. The wheel 19 swivels freely about a vertical axis 21.

As best seen in FIG. 3, in the preferred form the seat frame 11 comprises a thigh support frame 48 and a seat support frame 22 articulated together at a pivot axis coincident with the pivot axis 13 of the back 12. The frame 22 is generally cruciform and arcuately dished, comprising an arcuate longitudinally extending bracket 23 terminating at the rear in a rearwardly upwardly swept projection 24, and an arcuate transversely extending bracket 26, having at each end a horizontally outwardly extending end portion 27. The seat support frame 22 supports a bowl-shaped seat 28 which may be moulded of fibre-reinforced plastic, for example. The bowl-shaped seat 28 locates the buttocks of the user when seated in the vehicle, since the user's weight retains the user within the depression of the bowl and resists any tendency for the user to be dislodged from the vehicle as a result of the reaction when the user pushes on the floor or other surface on which the vehicle is to be moved. The seat 28 may be connected to the brackets 23 and 26 by rivets or other mechanical fasteners passed through the seat and through the brackets.

The roller arrangement 17 on which the seat support frame 22 is supported comprises a vertical shaft 29 connected at its upper end to a bracket which is connected to the longitudinal bracket 23 by screws, bolts or other fasteners. A horizontal shaft 31 supports a freely rotating wheel 32 at each end and carries in its middle a boss 33 which is preferably fixed non-rotatably to the vertical shaft 29. The roller arrangement 17 may generally be similar to that employed on skateboards. Advantageously, the longitudinal bracket 23 is formed with a series of longitudinally spaced holes so that the shaft 29 can be attached at various positions along the bracket 23, and so that the attachment of the roller arrangement 17 can be adjusted to a position which the individual user finds most comfortable or most convenient for balancing and propelling the vehicle. The caster wheel 19 swivelling around the vertical axis 21 allows sideways movement or steering of the front of the vehicle.

On the underside of the rearward projection 24 is mounted a block 34. A pair of pins 36 extend downwardly from the block, and pass through bores in a sliding support 37 which is biased downwardly by coil compression springs 38 reacting between the block 34 and the support 37. Stops on the ends of pins limit downward movement of the support 37. The support has a pair of rear wheels 39 journalled on it, which can be moved upwardly on the pins together with the support 37 against the action of the springs 38. On rearward tilting of the lower seat frame 22, whether as a result of a deliberate or an accidental rearward shift of the weight of the upper body of the user about the axis of the rear wheels 32, the rear wheels 39 contact the floor or other support surface and prevent or reduce the risk of inadvertent rearward overbalancing of the vehicle and its occupant. The resilient support for the wheels 39 provided by the springs 38 cushions impact of the wheels on the support surface and reduces or avoids jarring of the vehicle and of the user. If desired, by leaning backwardly, the user can tilt the vehicle backwardly about the axis of the rear wheels 39, to lift the wheels 32 off the floor and bring the vehicle to a position with the seat frame 11 and leg support 14 in the air and the back 12 resting on the floor. The user can spread his or her arms on the floor on either side of the vehicle to support the vehicle in this position.

The upper edge of the shell of the bowl-like seat 28 continues rearwardly in a generally rectangular extension 41. A generally T-shaped bar has its cross piece 42 secured on the extension 41 with bolts or other mechanical fasteners. A rearwardly extending element 43 of the bar is secured to the rearward projection 24, e.g., with bolts or the like. Each end of the crosspiece 42 is formed with an apertured lug 44. The lower end of the back 12 has an apertured hinge plate 47 secured to it, through which is passed a headed bolt 46, so that the back 12 pivots about the axis of the bolt 46. The above-mentioned thigh support frame, generally indicated at 48 in FIG. 3 is also pivoted on the bolt 46. The frame 48 comprises two rigid bars 49, on the rear end of each of which is connected an apertured block or lug 51. In the assembled form, each lug 51 of the upper frame bars 49 is positioned laterally outwardly of a respective lug 44 of the crosspiece 42, and the apertured hinge plate 47 is disposed between the lugs 44. The bolt 46 passed through the assembly is retained with a nut 52 threaded to the end of the bolt 46 opposite its head, the axis of the bolt 46 thus constituting the pivot axis 13.

Figure 7:
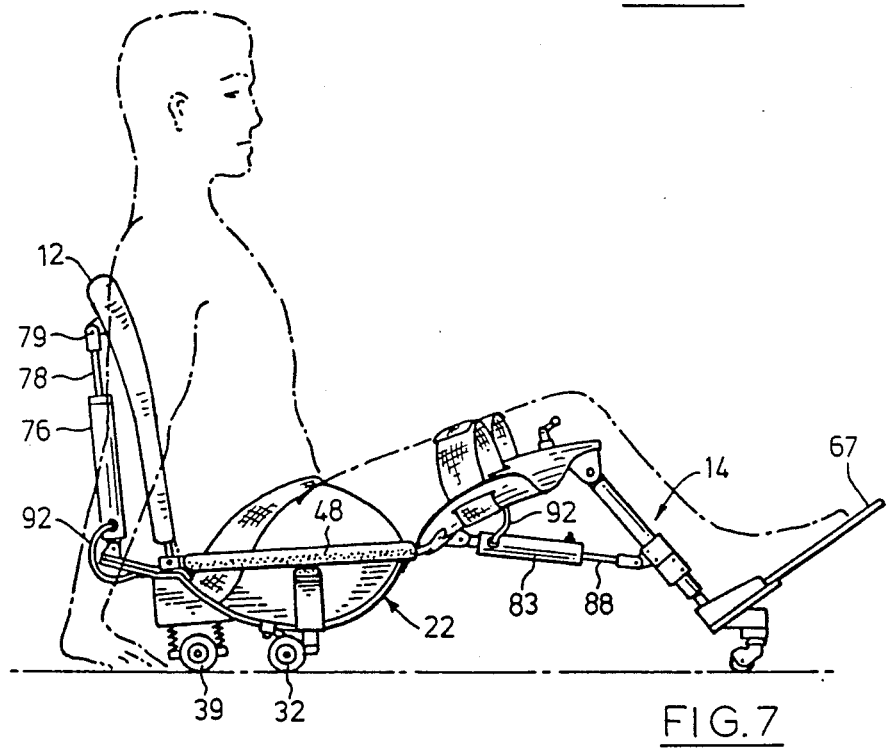

The bars 49 of the thigh support frame 48 are curved laterally convexly outwardly adjacent the rear so that in plan they conform approximately to the perimeter of the seat 28. Toward the front they curve outwardly tangentially to the seat 28 and forwardly, terminate in parallel ends 53. At an intermediate portion they are twisted so that their inner faces extend outwardly upwardly, and each bar has a laterally projecting apertured lug 54 on each side. The apertured lugs 54 receive fasteners securing a shell which forms a thigh support 56. The thigh support 56 may be a fibre-reinforced plastic moulding and comprises an upwardly forwardly inclining inverted channel section central portion 57 which extends over the ends 53 of the bars and over a generally trapezoidal stiffening or reinforcing fillet plate 58 which is interconnected at each end, e.g. by welding, to the adjacent inner sides of the bars 49 between the lugs 54 and the ends 53. Laterally outwardly from the central portion 57, the thigh support 56 comprises on each side an arcuately recessed surface 59, these surfaces 59 in use receiving the thighs of the user of the vehicle, as shown in FIGS. 6 and 7. The outer upturned ends of these surfaces help retain and locate the user's thighs and help prevent the users knees and thighs from falling laterally outwardly away from support 56 in the case of a user with paralyzed legs.

A clevis 61 or like pivot support is connected between the ends 53 of the bars 49 of the thigh support frame, and extends downwardly therefrom. A tubular telescopic lower leg strut 62 is pivoted in the clevis 61 by a pivot pin 61a, the axis of which constitutes the axis 16 about which the frame 48 and the strut 62 pivot parallel to the pivotal axis 13 about which the back 12, the seat support frame 22 and the thigh support frame 48 all pivot.

As best seen in FIG. 2, the strut 62 comprises an outer tube 62a, an intermediate diameter tube 62b disposed within the tube 62a and an inner tube 62c disposed within the intermediate tube 62b. The lower end of the tube 62c is connected, for example by welding, to a stub 63 secured, e.g. by welding, on the upper side of a transversely extending heel plate 64. A block 66 which rotatably mounts the caster wheel 19 for rotation about the axis 21 is connected to the underside of the plate 64. On the upper side of the plate 64 is connected a generally horseshoe shaped plate 67 on which the user's feet are supported. Thus, preferably the plate 67 defines a central aperture 68 which renders it more lightweight. The ends of the plate 67 adjacent the stub 63 are surmounted by upwardly extending walls which form pocket-like supports 69 for receiving and locating the user's heels, as best seen in FIGS. 6 and 7. The plate 67 may be detachably latched to the plate 64, so that the plate 67 can be removed to allow the vehicle to be folded to a more compact state when the vehicle is to be stored or transported.

Releasable clamps are provided on the tubes 62a, b and c, to clamp the tubes in selected telescoped position. An upper clamp 71 having a longitudinal split surrounds the outer tube 62a at a zone where the tube 62 is also split longitudinally. Screws 72 pass transversely between ends of the clamp on opposite sides of its split which screws can be tightened up to compress the tube 62a and clamp its inner surface tightly onto the outer surface of the intermediate tube 62b. Similarly, a lower split clamp 73 surrounds the intermediate tube 62b at a point where this is longitudinally split. The clamp 73 is provided with screws 74 which can be tightened up to clamp the intermediate tube 62b tightly onto the inner tube 62c. When the clamps are loosened by loosening the screws 72 or 74 the intermediate and inner tubes 62b and 62c can be extended or retracted longitudinally relative to their respective surrounding tubes 62a and 62b, to allow the strut 62 to be lengthened or shortened so that the user's feet rest comfortably on the plate 67 when the user is seated in the seat 28 with his or her thighs supported on the thigh support 56.

The vehicle as shown has an hydraulic linkage interlinking the movements of the back 12 relative to the seat support frame 22 and of the leg support 14 relative to the thigh support frame 48. As a result of this linkage, when the user leans backwardly from a relatively upright position as shown in FIG. 6, the rearward and downward movement of the back 12 drives the leg support 14 forwardly from the relatively sharply forwardly downwardly inclining position shown in FIG. 6 to a relatively gently inclining position shown in FIG. 8.

The linkage comprises a back hydraulic cylinder 76 and piston 77 connected between the back 12 and the rearwardly extending element 43. The upper end of the piston rod 78 is pivoted at 79 to a support plate 81 secured with rivets or the like to the upper portion of the back. The lower end of the back cylinder 76 is pivoted at 82 to a pivotal support connected on the upper side of the rear end of the element 43.

Similarly, a leg support cylinder 83 is pivoted at its rear end to a pivotal support 86 connected to the underside of the fillet plate 58. A leg support piston 87 working in the cylinder 83 has its rod 88 pivotally connected at its forward end 89 to a pivotal support 91 connected to the upper clamp 71 on the leg support 14. The cylinders 76 and 83 are connected through a conduit 92 and through an openable and closable valve 93 having a control lever 94. With the valve 93 in the open position, when the piston 77 is compressed in the cylinder 76, hydraulic fluid is driven through the conduit 92 to the cylinder 83, extending the piston and rod 88 and thus driving the leg support 14 to the relatively gently inclining position of FIG. 8. The valve 93 may be closed to lock the cylinders and pistons in the positions of FIG. 8, thus maintaining the back 12 and the leg support in the relatively extended positions, to facilitate mounting on or dismounting from the vehicle.

The clamp 73 and the intermediate tube 62b are preferably connected non-rotatably to the outer tube 62a, for example by having the tube 62b splined to the tube 62a and the clamp 73 splined to the tube 62a so that the compressive force exerted by the rod 88 on extension of the piston 87 does not swivel the pivotal support 91, the clamp 73 or the tube 62b about the axis of the tube 62a.

In order to maintain the back 12 and leg support 14 normally in the relatively contracted position shown in FIG. 6, means are provided to bias these members toward this position. In the preferred form, the biasing means are connected between thigh support frame 48 of the seat frame 11 and the leg support 14, although, as will be appreciated, because of the linkage between the movements, the biasing means could alternatively be connected between the back 12 and the seat frame 11, or at both positions. The biasing means in the example illustrated are conveniently provided by a closed gas-filled chamber within the cylinder 83, wherein an end wall 96 of the cylinder 83 is closed and is provided with a gland or other sealing means through which the rod 88 passes. Movement of the vehicle toward the relatively extended position of FIG. 8, with extension of the piston 87 and rod 88 is therefore resiliently resisted by compression of the gas within the closed chamber. The chamber may be pressurized with a pressurized gas fill, e.g. compressed air, through a sealing nipple 97 provided on the side wall of the cylinder adjacent the end wall 96.

Figure 8:
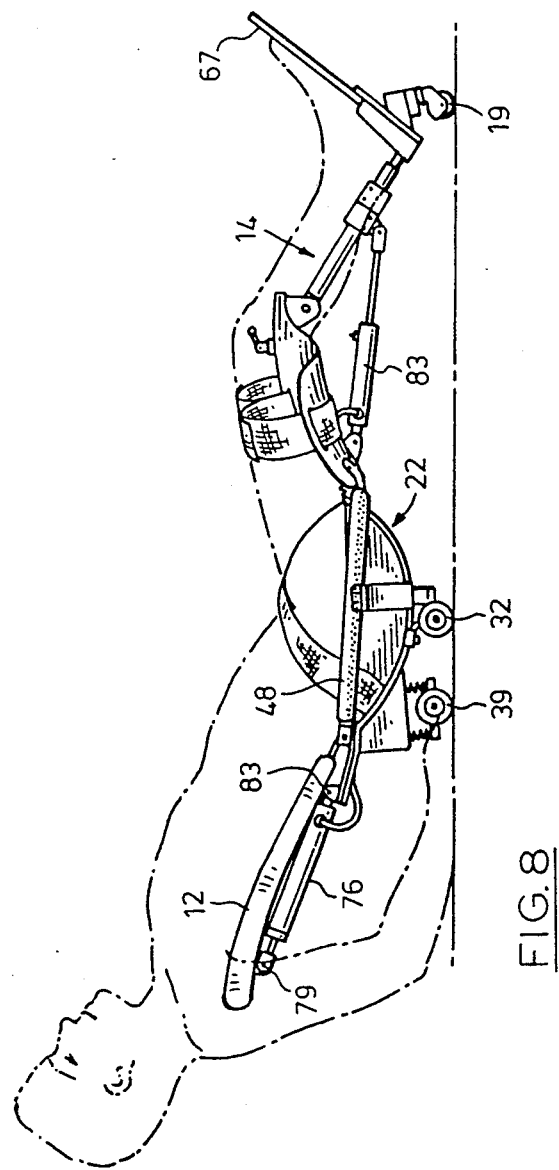
FIG. 8 shows a side view of the vehicle in extended configuration.
Figure 9:
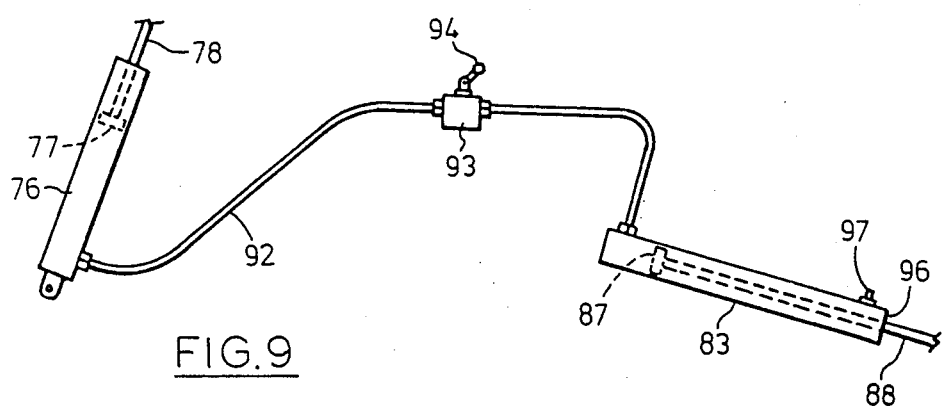
FIG. 9 shows an hydraulic linkage used in the vehicle.

In use, in order to mount the vehicle, if the vehicle is not in the extended position shown in FIG. 8, the user will normally press downwardly on the seat back 12 with his hands in order to rotate this rearwardly downwardly and to extend the leg support 14 forwardly outwardly, against the resilient resistance of the compressed air or other gas in the cylinder 83, to the relatively extended position shown in FIG. 8. By rotating the control lever 94, so that the valve 93 closes the conduit 92 to flow of liquid between the cylinders 76 and 83, the user can lock the vehicle in the extended position. The user having paralyzed legs, for example, having dismounted from a conventional wheelchair can perform these operations from a position seated or lying alongside the vehicle. Levering him or herself upwardly on the user's arms, the user can then manoeuver into a position seated in the bowl shaped seat 28 and can lift his or her legs with his or her hands onto the vehicle so that the thighs are supported on the thigh support 56 and the feet on the plate 67 with the heels engaging in the heel supports 69, generally in the position shown in FIG. 8. When the user rotates the control lever 94 to open the valve 93 and leans forwardly, the compressed gas in the foot support cylinder 83 drives the piston 87 to the retracted position while pumping liquid along conduit 92 to drive the piston 77 in the back cylinder 76 upwardly, thus pivoting the back 12 to an upright position and the leg support 14 to a position sharply downwardly forwardly extending relative to the thigh support frame, as shown in FIG. 6.

In place of the hydraulic linkage, other forms of linkage, such as mechanical linkages, may of course be used to link the back 12 and leg support 14 so that the back 12 moves between the upright position of FIG. 6 and the extended or lowered position of FIG. 8 as the leg support 14 moves between the contracted and extended positions shown in these Figs., respectively.

In simpler and less convenient and advantageous arrangements, there may be merely a latch between the back 12 and the seat frame 11 and between the latter frame and the leg support 14. The latch connected to the back 12 may be used to latch the back 12 selectively in the upright and relatively extended positions of FIGS. 6 and 8, respectively and similarly, the latch connected to the foot support 14 may be used to latch this selectively in the position of FIGS. 6 and 8, respectively. This arrangement, however requires that the user lift the back 12 to the upright position by hand, and draw the leg support 14 and seat frame toward one another to the contracted position of FIG. 8, and does not allow the user the freedom of control over the position of the vehicle that can be achieved with the above-described linkages. It is not preferred, therefore.

With the arrangement shown in the drawings, the pistons 77 and 87 are preferably of the same dimensions, so that a given retraction of the piston rod 78 is matched by an equal extension of the piston rod 88. With other geometries of the variable triangles formed by the points 13, 79 and 82 and 16, 84 and 89, however, differing diameters of the pistons 77 and 87 and of their respective cylinders may be employed, resulting in differential retractions and extensions of the rods 78 and 88.

The wheels 19 and 32, when engaged with the floor or other support surface, support the user seated in the seat frame a short distance above the floor, so that in the relatively contracted or flexed position of the vehicle shown in FIG. 6, the user can readily propel the vehicle in any direction across the floor or other support surface by thrusting the user's hands on the support surface. The flexed position of the vehicle tends to retain the user's body firmly on the vehicle, reducing or avoiding risk of the user's body slipping on or dislodging from the vehicle as a result of the reaction between the user's arms and the floor or other support surface. The apposition of the user's body with the trunk upright and the knees flexed forwardly also facilitates the propulsion of the vehicle since it allows the user to push with good mechanical advantage against the floor or other support surface.

The preferred structure as shown wherein the thigh support frame 48 is pivotable independently of the seat support frame 22 has the advantage that it allows the user to propel the vehicle forwardly more efficiently and more comfortably. As the user leans forwardly to place his or her hands on the floor adjacent the leg support 14 or wheel 19 as shown in FIG. 6, the arrangement allows the user's pelvis to drop and rotate forwardly downwardly relative to the thighs. In the preferred form, this is accommodated by the seat support frame 22 pivoting downwardly relative to the thigh support frame 48, as is indicated by the separation between the frames indicated in FIG. 6.

As the user strokes rearwardly with the hands to propel the vehicle forwardly, the user will tend to lean backwardly to the position shown in FIG. 7 if the user makes a full follow-through action with the arms. As the user leans backwardly, the lower seat frame 22 pivots rearwardly downwardly about the horizontal axis of the wheels 32, bringing the rear wheels 39 into contact with the floor. The contact of the wheels 39 with the floor limits further rearward movement of the seat support frame 22, so that as the user leans backwardly, the piston rod 78 and piston 77 are compressed downwardly, causing some extension of the piston rod 88 and leg support 14. This extension, and further rearward pivoting of the seat back 12 is resisted by the gas compressed in the cylinder 83. The rearward leaning of the user's body tends to depress the thighs and hence the thigh support frame downwardly, so that the frames 22 and 48 close together, as seen in FIG. 7.

In the case in which the user has little power of voluntary movement of the upper body, it may be desirable to provide means resiliently bringing the thigh support frame 48 toward the seat support frame 22, in order to assist the user in balancing in the vehicle and to reduce or avoid any problem of the lower seat frame tending to tip forwardly downwardly. For example, resiliently extensible means 102 may be connected between the fillet plate 58 and the forward end of the longitudinal arm 23. The resilient means 102 should be a membrane or strap of rubber or the like in order to avoid pinching the user's body. On completion of the rearward stroke of the arms, the user reaches forwardly again, the forward shift of the user's body tending to tip the seat support frame 22 forwardly downwardly to the position of FIG. 6, so that the cycle of motion of the vehicle can recommence.

In modified forms of the vehicle, the thigh support frame 48 and seat support frame 22 are fixed relative to one another, so that the seat frame 11 is a unitary frame. In such case the user's pelvis cannot drop and rotate forwardly relative to the thighs and the user cannot reach as far forwardly, limiting the length of the stroke which the user can make in propelling the vehicle with the arms, and limiting the efficiency of propulsion of the vehicle. The form of the vehicle as shown, in which the seat frame 11 comprises a seat support frame 22 and a thigh support frame 48 pivoted together about an axis parallel to the pivotal axes 13 and 16 is preferred, therefore. Preferably the axis about which the seat support frame 22 and the thigh support frame 48 pivot is adjacent the rear of the lower seat frame 22, so that it approximates in position the hip joint between the user's pelvis and femur, so that the user's thigh does not ride longitudinally along the thigh support 56 as the frame 48 pivots toward and away from the seat support frame 22. Conveniently, as in the example shown, the pivotal connection coincides with the pivotal axis 13.

In use of the wheelchair in, for example, a ball passing game or the like, the user can move the vehicle to the elongated or extended position of FIG. 8 by leaning backwards beyond the position of FIG. 7, so that the back 12 and piston rod 78 are compressed rearwardly against the resilient resistance of the air in the cylinder 83. This position can be useful, in, for example, blocking an opponent from passing a ball to another player or in blocking an opposing player's opportunity to score a point by placing or throwing the ball into a net, basket, goal or the like. The extended position can be attained with or without placing the hands on the ground as shown in FIG. 8. In the event that the hands are not placed on the ground normally the vehicle will at least initially tilt rearwardly about the horizontal axis of the roller arrangement 17, so that the caster wheel 19 will lift off the floor until the weight of the user's upper body, compressing the piston 77 in the back cylinder 76, causes the leg support 14 to extend fully. On leaning forwardly, the above motions can be reversed, the compressed gas assisting the driving of the vehicle from the position of FIG. 8 through the position of FIG. 7 to the position of FIG. 6.

In the case of a user having limited mobility of the upper body, for example, having limited mobility below chest level, the compressed gas fill in the cylinder 83 may be adjusted so that inclining the arms, shoulders and the head forwardly and rearwardly moves the vehicle to the configurations of FIGS. 6 and 8, respectively.

In the preferred form, the roller arrangement 17 is positioned so that its horizontal axis approximately coincides with the centre of mass of the trunk or upper body of the user sitting upright in the seat frame, since this facilitates movement of the vehicle between the positions of FIGS. 6, 7 and 8, for example, by forward and rearward rocking the user's upper body.

As the user leans backwardly, the lower seat frame 22 pivots upwardly forwardly about the horizontal axis of the roller arrangement 17, while the user's thighs and the thigh support frame 48 are lowered, and the reaction on the user's body tends to depress the thigh support frame 48. Desirably, to avoid upward pressure on the user's thighs applied by the thigh support 56 the vehicle is provided with means limiting downward pivoting of the thigh support frame 48 relative to the lower seat frame 22. Preferably these means are formed by an abutment on one of these frames engaging a stop surface on the other, and, in the example shown, the bars 49 are adapted to engage a stop surface formed by the outwardly extending end portions 27 on the transverse brackets 26. A resilient, for example foam rubber, pad 103 is bonded on each portion 27 to resiliently cushion the engagement and avoid any shock or impact transmitted from the frame 22 or 48 to the user. Preferably the bars 49 are surrounded by resilient cushioning material, for example foam rubber tubing 104, which will further cushion the engagement with the pad 103 and avoid sharp impact between the user's body and the bars 49 particularly when the frame 48 is in a raised position relative to the seat frame 23.

On wishing to dismount from the vehicle, the user can lean rearwardly to achieve the position shown in FIG. 8, whereupon the user can move the valve control lever 94 to the closed position, locking the vehicle in the extended position, thus facilitating the user's levering him or herself off the vehicle or directly onto a conventional wheelchair or onto the floor alongside the vehicle, from which the user can pull him or herself onto a conventional wheelchair.

Preferably at least one of the roller arrangement 17 and the wheel 19 are fixed and do not swivel about a vertical axis, in order that the vehicle can be steered stably. As the vehicle moves between the contracted and extended positions shown in FIGS. 6 and 8, through the position of FIG. 7, the leg support 14 and the seat frame 11 rollingly approach toward and retreat from one another along the floor or other support surface, rolling on the caster wheel 19 and on the rollers 17 and on occasion on the rear wheels 39 as well. Further, the seat frame 11 pivots forwardly downwardly about the axis of the wheels 32 as the vehicle moves toward the position of FIG. 8 and rearwardly downwardly as it moves toward the FIG. 7 position. Simultaneously the leg support 14 pivots rearwardly downwardly and rearwardly upwardly about the axis of the caster wheel 19. If the axis of the wheel 19 (or of the roller arrangement 17, if this swivels instead of the wheel 19) is initially swivelled to one side so that it is nonparallel to the axes 13 and 16, the drag of the wheel 19 (or on the wheels 32) on the floor as the move toward or away from one another exerts a swivelling movement about an upwardly extending axis, tending to position the axis parallel to the axes 13 and 16.

With the vehicle as shown in the drawings, the user can roll the vehicle over laterally, by twisting the upper body to one side and, if necessary or desired, using the hands or arms to push upwardly and lift one side while cushioning the rolling motion on the opposite side. The generally rounded periphery of the foot plate 67 allows the plate 67 to roll on the floor or other support surface, thus facilitating the lateral rollover. The ability to perform a lateral rollover or a series of lateral rollovers greatly increases the mobility of the user of course, and provides the user with the ability to perform some manoeuvers identically or similarly to those performed by non-disabled persons.

In the preferred form, the vehicle is provided with retaining means for releasably retaining the user's pelvis in the seat 28 and the user's thighs and feet on the thigh support 56 and on the plate 67, respectively, in order to reduce or avoid risk of the occupant becoming separated from the vehicle especially when performing maneouvres such as rollovers. The retaining means may comprise strapping such as a strap 106 attached to the front portion of the bracket 23 passing between the user's legs and engageable with a waist strap 107 secured to the rear portion of the bracket 23, a pair of straps 108 passing through slots in each recessed surface 59 of the thigh support 56 as shown in FIG. 8, and a pair of straps 109 secured to the foot plate 67 and engageable around the user's feet. The end portions of the straps 106 to 109 are releasably securable together, for example with hook and loop fastener pads 111, for example VELCRO (trade mark) hook and loop fastener pads.

The ability of the user to flex the legs between the relatively bent position of FIG. 6 and the relatively straightened position of FIG. 8 by leaning backwardly and forwardly has the further advantage that the flexing of the legs increases the blood flow to the legs and avoids or reduces the incidence of osteoporosis and other conditions liable to result from reduced blood flow to the legs of persons with paralyzed legs.

Figure 10:
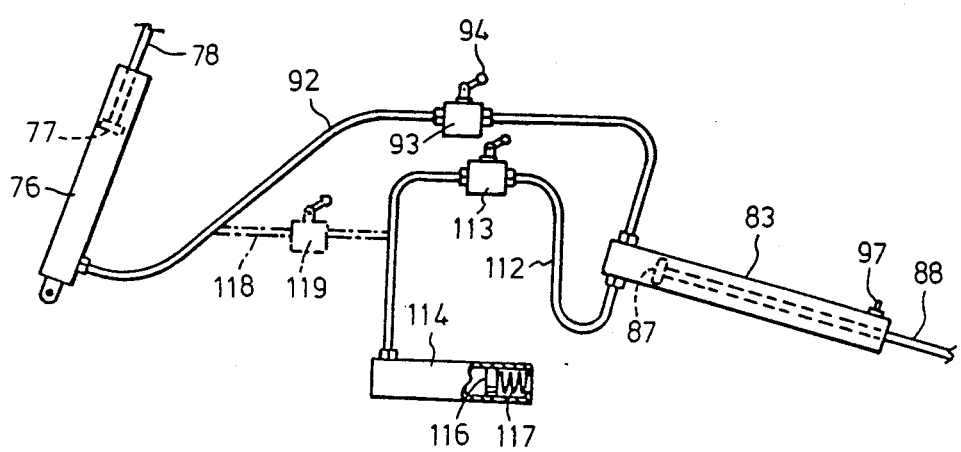
FIG. 10 shows a modified hydraulic linkage.

The vehicle may include means for releasing the linkage between the back 12 and the leg support 14 to allow the leg support 14 to move against the action of a biasing means while the back 12 remains fixed. As shown in FIG. 10 these means may comprise an auxiliary conduit 112 connecting the hydraulic liquid filled side of the foot support cylinder 83 through a switch-controlled on-off valve 113 to an auxiliary hydraulic liquid filled cylinder 114 in which moves a piston 116 biased by a spring 117 to compress the hydraulic liquid. With this arrangement, the user seated in the position shown in FIG. 7 may close the valve 93 to lock the back 12 in upright position and open the switch-controlled valve 113 which may conveniently be mounted alongside the control lever 94, freeing the leg support piston 87 and rod 88 to reciprocate. The user can then exercise the legs by pressing downwardly on the knees against the action of the compressed gas in the cylinder 83 to extend the legs and the leg support 14, liquid being drawn into the cylinder 83 from the cylinder 114. On release of the downward pressure, the compressed gas drives the knees upwardly, liquid being expelled from cylinder 83 to cylinder 114.

The vehicle may also include means for releasing the linkage between the back 12 and the leg support 14, allowing the back 12 to reciprocate against the action of a biasing means while the leg support 14 remains fixed. Such means may comprise a second auxiliary conduit 118 shown in broken lines in FIG. 10 connecting the back cylinder 76 to the auxiliary cylinder 114 through a switch-controlled on-off valve 119 which may be positioned adjacent the control lever 94. With the valve 93 closed and the knees bent in the position shown in FIG. 7, the user may open the valve 119 so that the user can perform sit ups. The liquid expelled from the back cylinder 76 when the user leans backward presses to the auxiliary cylinder 114, compressing the spring 116. If desired, the valve 119 may be closed with the back 12 in the downward position, so that the user can exercise without the assistance of the upwardly forwardly pivoting force exerted by the spring 117 tending to drive liquid from the auxiliary cylinder 114 to the back cylinder 76. On opening the valve 119, the spring 117 restores the expelled liquid to the back cylinder 76 when the user leans forwardly, so that the balance of liquid between the back and leg support cylinders 76 and 83 is not disturbed. The valves 113 and 119 are maintained closed in the normal use of the vehicle described above.

I claim:

1. User propelled vehicle comprising a seat frame, a back pivotally connected to the rear of the seat frame about a first pivot axis, a leg support pivotally connected to the front of the seat frame about a second pivot axis parallel to the first, a support surface engaging roller on each of the seat frame and the leg support, and the leg support and seat frames rollingly approaching and retreating from one another along the support surface between a contracted position, in which the seat frame extends forwardly upwardly and the leg support extends sharply forwardly downwardly from the seat frame, and an extended position, in which the seat frame extends approximately horizontally and the leg support inclines relatively gently thereto, and means for maintaining the vehicle in said contracted and extended positions and for maintaining the back in positions extending sharply upwardly from or relatively gently inclining with respect to the seat frame, and wherein said rollers support the vehicle on the support surface with said first and second pivot axes normally generally horizontal and with the seat frame supported a short distance above the support surface so that the user occupying the seat frame can propel the vehicle by thrusting on the support surface with the user's hands.

2. Vehicle according to claim 1 wherein the seat frame comprises a seat support frame and a thigh support frame pivotally connected to the seat support frame about a third pivot axis parallel to said second axis.

3. Vehicle according to claim 2 wherein the seat support frame and thigh support frame are pivotally connected adjacent the rear of the seat support frame.

4. Vehicle according to claim 3 wherein the seat support frame and thigh support frame are pivotally connected about said first pivot axis.

5. Vehicle according to claim 2 including means limiting downward pivoting of said thigh support frame relative to said seat support frame to a limiting position.

6. Vehicle according to claim 5 wherein said means limiting downward pivoting comprise an abutment on said thigh support frame or on said seat support frame engaging a stop surface on the other.

7. Vehicle according to claim 5 including means resiliently cushioning pivoting of said frames toward said limiting position.

8. Vehicle according to claim 2 including resilient means resiliently resisting upward pivoting of the thigh support frame relative to the seat support frame.

9. Vehicle according to claim 2 wherein said thigh support frame comprises a pair of arcuately recessed thigh support surfaces for receiving and locating the thighs of the user.

10. Vehicle according to claim 9 including releasable strap means for releasably retaining the thighs of the user in said thigh support surfaces.

11. Vehicle according to claim 1 wherein said roller engaged by the support surface on the seat frame is approximately aligned with the centre of mass of the trunk of a user sitting upright on said seat frame.

12. Vehicle according to claim 1 wherein the seat frame comprises a bowl-shaped seat for receiving and locating the buttocks of the user.

13. Vehicle according to claim 12 including releasable strap means for releasably retaining the user's pelvis in the bowl-shaped member.

14. Vehicle according to claim 1 including biasing means resiliently biasing the vehicle toward the contracted position and the back toward the sharply upwardly inclining position.

15. Vehicle according to claim 14 comprising linkage means between the back and the leg support moving the back and leg support together in pivotal motion about the seat frame so that the back moves to the position extending relatively sharply upwardly as the seat frame and leg support move from said extended to said contracted position.

16. Vehicle according to claim 15 wherein said linkage means comprise a piston and cylinder connected between the seat frame and the back and between the seat frame and the leg support and a conduit hydraulically interconnecting the cylinders.

17. Vehicle according to claim 16 including a valve in said conduit which can be closed to lock the vehicle in said extended position.

18. Vehicle according to claim 16 wherein said biasing means are connected between the seat frame and the leg support.

19. Vehicle according to claim 7 wherein said biasing means comprise a closed gas-filled chamber within the cylinder connected between the seat frame and the leg support, said gas-filled chamber being on the side of the piston opposite the connection to said conduit.

20. Vehicle according to claim 15 comprising linkage releasing means operable to allow the leg support to move against the action of a biasing means while the back remains fixed.

21. Vehicle according to claim 15 comprising linkage releasing means operable to allow the back to move against the action of a biasing means while the leg support remains fixed.

22. Vehicle according to claim 1 comprising a foot support plate, on which the soles of the user's feet are supported, connected to an end of the leg support spaced from its pivotal connection to the seat frame.

23. Vehicle according to claim 22 including releasable retaining means for strapping the user's feet on the foot support plate.

24. Vehicle according to claim 22 wherein said plate has a generally rounded periphery.

25. Vehicle according to claim 1 wherein either the roller on the seat frame or the roller on the leg support swivels about a vertical axis.

26. Vehicle according to claim 1 comprising a rigid rearward extension from the seat frame which contacts the ground and limits rearward rocking of the seat frame.

27. Vehicle according to claim 26 including a roller member on the rearward extension for contacting the ground when the seat frame is rocked rearwardly.

* * * * *